Jan. 7, 1969 C. M. WAKEMAN 3,420,548
CONTROL DEVICE FOR STABILIZING ARTICULATED VEHICLES
Filed Oct. 7, 1966 Sheet 1 of 2
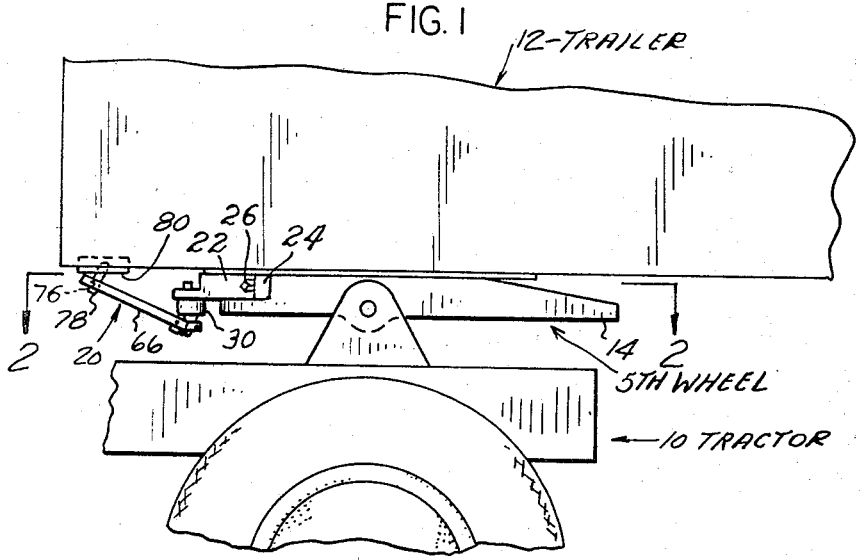
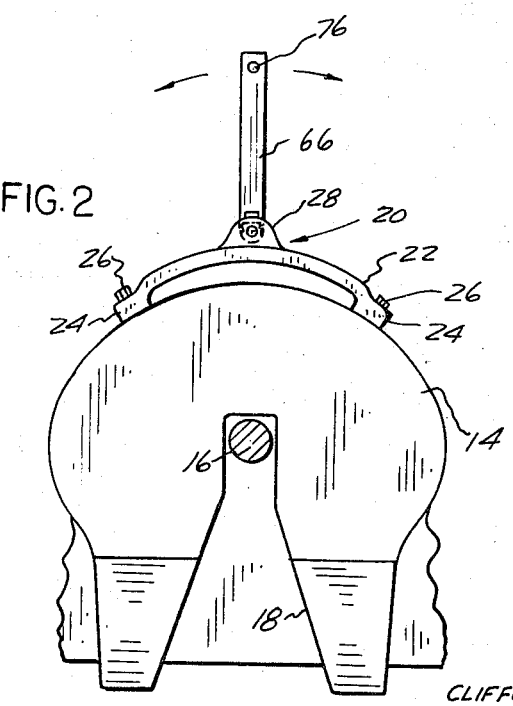
INVENTOR
CLIFFORD M. WAKEMAN
BY Hauke, Kraas, & Gifford
ATTORNEYS

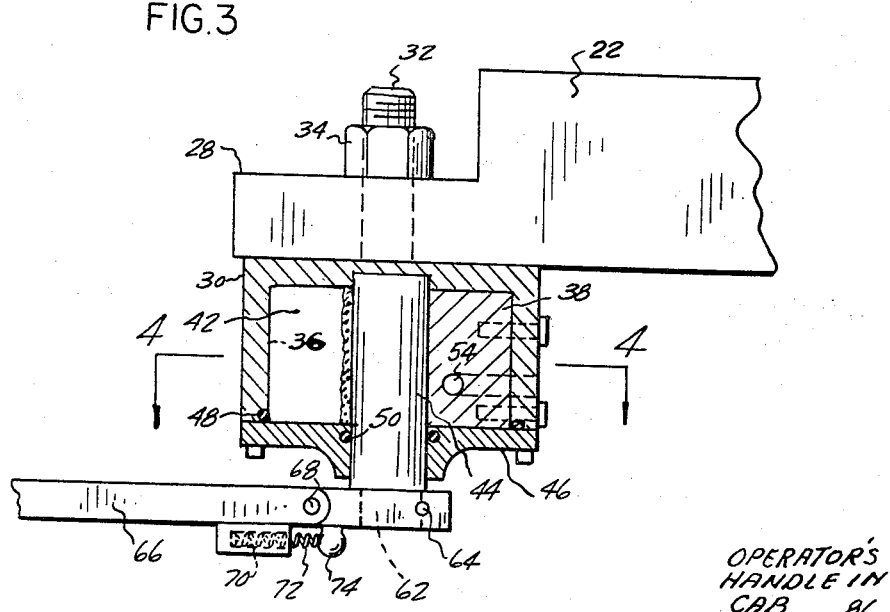
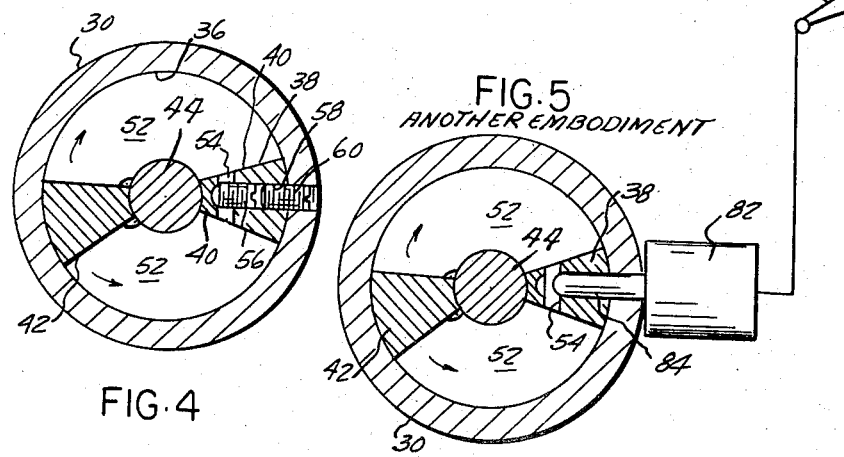

United States Patent Office 3,420,548
Patented Jan. 7, 1969

3,420,548
CONTROL DEVICE FOR STABILIZING ARTICULATED VEHICLES
Clifford M. Wakeman, Flint, Mich., assignor to The Mather Company, Toledo, Ohio, a corporation of Ohio
Filed Oct. 7, 1966, Ser. No. 585,033
U.S. Cl. 280—432    9 Claims
Int. Cl. B62d 53/06; B62d 53/08; B62d 63/08

ABSTRACT OF THE DISCLOSURE

A vane type hydraulic damping device between articulated vehicles which may be separated, such as being mounted on the fifth wheel of a tractor and connected to a trailer by a releasable lever means for rotating a vane in a cylindrical chamber of a rotary damping device as the vehicles articulate, and providing a fluid communication duct, such as through a fixed vane, between the chambers formed on the opposite side of it and the movable vane in the damping device, and means for controlling the flow of this fluid between said chambers by a pre-set and locked, or by an operator controlled solenoid, valve means in this duct vane.

Background of the invention

In the usual tractor-trailer arrangement, a trailer unit is coupled to a tractor which provides motive power for drawing the trailer. Normally there is a connection provided for coupling the trailer to the tractor which in the case of a house trailer or other small trailers takes the form of a hitching arrangement and in the case of large commercial vehicles, takes the form of a fifth wheel coupling which provides a point about which the vehicles may pivot. Although it will be understood that this invention relates to any vehicle combination including a tractor and a towed vehicle, for purposes of description, the invention is described with reference to a semi-trailer unit wherein the trailer unit is provided with wheels located near the trailing end of the unit, the front end of the unit being supported by the coupling device attached to the tractor. The tractor includes a steering mechanism for turning the front wheels of the vehicle and the turning movements cause the trailer to pivot about the coupling point in order to follow the path dictated by the steering movements and described by the tractor.

An extreme pivotal movement of the trailer as related to the tractor may result in a condition commonly referred to as jackknifing. Jackknifing describes the condition where the trailer swings into an extreme position about the coupling point so that the trailing end of the trailer approaches the front of the tractor. Such a condition may arise under adverse driving condition such as where the highway is slippery and inertia causes the trailer to pivot into an uncontrollable position about the tractor.

The present invention represents an improvement over devices of the prior art which attempt to control this jackknifing condition such as the stabilizing device disclosed in my Patent 2,565,285, issued Aug. 21, 1951 and which disclosed a control device generally taking the form of a pair of opposed hydraulic cylinders arranged to provide a controlled resistance.

Summary of the invention

This invention relates to a hydraulic control device for coupled vehicles and more particularly to a hydraulic device which provides hydraulic resistance in opposition to uncontrolled forces tending to pivot a trailer with respect to a tractor to which the trailer is coupled so that the operator of the tractor is provided with sufficient time to respond to the situation.

A preferred embodiment of the present invention, which will be subsequently described in greater detail, comprises a housing defining a cylindrical chamber which is mounted to a fifth wheel coupling such that the axis of the chamber is substantially parallel to the axis of rotation of the trailer and tractor. A fixed vane and a movable vane are disposed in the cylindrical chamber to define a pair of separate chamber sections.

The movable vane is supported for rotation within the chamber and is connected through a lever to the trailer so that it rotates in response to a movement of the trailer relative to the tractor. As the movable vane rotates, it causes hydraulic fluid to pass from one of the chamber sections through a restricted orifice in the fixed vane to the opposite chamber section. The rotation of the movable vane is controlled by the rate at which the fluid is interchanged between the chamber sections through the controlled opening of the orifice. This controlled movement of the movable vane controls the rate at which the trailer can pivot relative to the tractor.

The controlled opening of the orifice is regulated by a valve which may be pre-set and locked or may take the form of a solenoid valve having a remote actuating station available to the driver of the vehicle and which is operable to completely restrict fluid interchange through the orifice so that relative pivotal movement between the vehicles is arrested. By locking the vehicles in a selected alignment, the driver is provided with additional means for controlling their combined movement.

In addition to the advantages provided by the device of my aforementioned patent, the present invention provides a controlled hydraulic resistance through an increased arc of 130 degrees on either side of the longitudinal center line of the vehicles as compared to approximately 35 degrees of the earlier device. Another major improvement in my present invention is a substantial reduction in weight from a weight of about 135 pounds to a unit weighing about 15 pounds.

Another major feature of the present invention is the increased responsiveness of the control device to changes in the relative pivotal positions of the two vehicles and which creates a hydraulic force in opposition to this pivotal movement so that the driver is permitted sufficient time to respond. Thus for example in a tractor-trailer combination not equipped with the device of the present invention, a jackknifing condition can arise and occur in a split second, leaving the operator of the vehicle with no time to react to the condition to take corrective measures. A tractor-trailer combination utilizing the present invention creates a force in opposition to the forces tending to jackknife the vehicles so that the jackknifing movement is reduced, thus permitting the driver adequate time to respond.

In addition to the safety feature of the present invention for preventing jackknifing, the preferred embodiment provides a cushioning effect on the rhythmic oscillations which occur in normal long distance driving conditions between the trailer and the tractor and which is a contributing factor in driver fatigue. By absorbing minor vibrations originating in the movement of the trailer and which are transmitted through the coupling to the tractor, the driver is relieved from stress which tend to cause physical discomfort and weariness.

Another major advantage of the control device illustrating the present invention is that it may be mounted on and used with existing tractor-trailer equipment with very little adaptation of the tractor-trailer combination to accomodate the device. This advantage is of particular value in view of the substantial costs that could occur in making major changes in existing tractor-trailer equipment.

Another major advantage of the present invention is its inherent simplicity which is both rugged in construction and reliable in operation.

Objects of the invention

Therefore an object of the present invention is to improve control devices for stabilizing tractor-trailer type of equipment and which may be readily mounted to the fifth wheel coupling of any tractor, regardless of size or make, without interference with any of the tractor's electrical, vacuum or pneumatic systems.

Another object of the present invention is to provide a control device for stabilizing the relative pivotal movement between a trailer and a tractor to which a tractor is coupled and which is effective through a turning arc which is greater than any arc provided by the prior hydraulic art devices.

Still another object of the present invention is to reduce the weight of control devices for stabilizing the relative pivotal movement between a tractor and its towed trailer by providing a simple fluid tight housing defining a closed chamber which may be fixed to a fifth wheel coupler and having a movable vane releasably connected to the trailer and supportable for rotation in the chamber for movement which is restricted by a controlled interchange of hydraulic fluid through an orifice, so that the controlled movement of the vane controls the rate at which the trailer pivots relative to the tractor.

Other objects of the present invention are to automatically prevent jackknifing at any time; provided means for holding the towed and towing units in alignment on downgrades or upon the sudden application of the braking apparatus; to permit the instantaneous locking of a trailer and the tractor into a single unit at drivers discretion and to unlock them as quickly; and to eliminate the whipping of trailers, whether consisting of two or four wheelers.

Brief description of the views

Still further objects and advantages of the present invention will become apparent to one skilled in the art to which the invention pertains upon reference to the following detailed description. The description makes reference to the accompanying drawings in which like reference characters refer to like parts throughout the several views and in which:

FIG. 1 is a side elevation of portions of a tractor and a trailer showing the units coupled to one another and also illustrating a control device embodying the present invention;

FIG. 2 is a top plan view of the fifth wheel coupling illustrated in FIG. 1 and taken substantially on the lines 2—2 of FIG. 1;

FIG. 3 is a cross-sectional view of the control device illustrated in FIG. 1;

FIG. 4 is a sectional view taken along lines 4—4 of FIG. 3; and

FIG. 5 is a sectional view similar to FIG. 4 but illustrating another embodiment of the present invention.

Detailed description of preferred embodiments

Now referring to the drawings, the control device of the present invention is illustrated in a commercial tractor-trailer vehicle combination having a fifth wheel coupling device but it is to be understood that the invention has utility with other separable articulated vehicle combinations having a connection comprising a conventional ball and socket arrangement. As can best be seen in FIG. 1, the tractor unit is indicated generally by 10 and the trailer is illustrated at 12. The two units are coupled together by a conventional fifth wheel coupler 14. The fifth wheel coupler 14 is mounted on the rearward end of the tractor 10 and is adapted to receive a kingpin 16 which depends downwardly from the trailer. Normally the tractor 10 is backed toward the trailer unit 12 such that the kingpin 16 is received into a generally V-shaped slot 18 provided in the fifth wheel coupler 14. Suitable locking devices (not shown) are provided to lock the pin 16 in coupler 14 so that when the trailer and the tractor are connected together, the trailer 12 can pivot relative to the tractor 10 about a substantially vertical axis defined by kingpin 16. Such an attachment of a trailer-tractor is conventional and permits the trailer to move pivotally in relation to the tractor as the tractor is steered around curves in the highway.

A control device generally indicated at 20 is mounted to the forward end of the fifth wheel coupler 14 and connected to the trailer and is actuated by the pivotal or oscillatable movement of the trailer relative to the tractor. This movement sets up a controlled hydraulic force in control device 20 in opposition to the movement so that the rate of relative movement is reduced to a controllable magnitude. The control device 20 further permits the trailer to be locked into any selected alignment relative to the tractor 10.

Referring to FIG. 2 the control device 20 includes a mounting bracket 22 having a pair of spaced apart pads 24 which provide a machined mounting surface to accommodate the curvature of the forward end of the coupler 14 and are secured thereto by threaded fasteners 26. It is to be understood that mounting bracket 22 can be adapted to accommodate the curvature of any conventional fifth wheel coupling. The mounting bracket is arranged so that an ear 28 is disposed on the longitudinal axis of the trailer. A hollow cylindrical housing 30 has a depending stud 32 which is attached to the ear 28 by a threaded fastener 34. Housing 30 defines a cylindrical chamber 36 which preferably has an axis arranged parallel to the pivotal axis defined by the kingpin 16.

A fixed vane 38 is provided in the chamber 36 and has a pair of opposite faces 40 defined by planes passing through the axis of the chamber 36.

A movable vane 42 is supported and journalled for rotation or oscillation within the chamber 36 by an integral or fixedly attached pivot or shaft 44. Referring to FIG. 4, the shaft 44 is disposed in the longitudinal axis of chamber 36 so that vane 42 oscillates or rotates about the axis of the chamber 36. Shaft 44 makes a fluid tight seal with the inner end of the fixed vane 38. The outer end of the vane 42 has an arcuate surface corresponding to the surface of the chamber 36 and makes fluid tight engagement therewith. The opposite faces of the movable vane 42 are defined by planes passing through the axis of the chamber so that in its extreme positions, the movable vane will have a face which abuts one of the faces of the fixed vane 38.

A cap member 46 seals off the lower end of the chamber 36 so that the fluid chamber 36 is fluid tight. O-rings 48 and 50 provide a seal between the cap 46 and the housing 30 and between the cap 46 and the shaft 44. It is to be understood that the fixed vane 38 and movable vane 42 cooperate to provide a pair of annularly spaced variable volume sector-shaped chamber sections 52.

Fluid communication is provided between the chamber sections 52 by an orifice in the duct 54 formed in the fixed chamber 38. The orifice opening is controlled by a flow control valve 56 which is radially adjustable and pre-set in a threaded bore 58 provided in the fixed vane 38. The valve 56 is illustrated in the extreme inward position wherein it completely restricts fluid interchange between the fluid intersection 52. By withdrawing the valve 56, a selective orifice opening can be provided. A lock screw 60 could prevent displacement of the valve 56 from its selected or pre-set position caused by vibrations of the vehicles.

The lower end of the shaft 44 extends through an opening in the cover plate 46 and is narrowed as indicated to carry a swivel clamp 62 which is locked thereto by a threaded fastener 64.

A lever arm 66 is pivotally connected by a pin 68 to the clamp 62 for movement about an axis at right angles to the axis of rotation of the shaft 44.

The under side of the lever 66 is provided with an enlargement having a socket 70 formed therein which seats a spring bias member 72, the outer ends of which react against a lug 74 carried by the swivel pin 62. The spring 72 has a stiffness such that it normally biases the lever 66 toward the angular position illustrated in FIG. 1.

Referring to FIGS. 1 and 2, the forward end of the lever arm 66 is provided with an aperture 76 which receives a pin 78 carried in a longitudinally slotted bracket 80 supported on the under side of the trailer 12 for release attachment of the lever arm to the trailer.

It can be seen that forces tending to pivot the trailer 12 about the fifth wheel coupling 14 will also produce a force on the lever 66 which will rotate the movable vane 42 in the chamber 36. Rotation of the vane 42 is resisted by the force produced by hydraulic fluid in the corresponding chamber section 52 and the turning movement reduced to a rate which corresponds to the rate at which hydraulic fluid can pass through the orifice in the duct 54. In the FIG. 4, the valve 56 completely restricts the orifice in the duct 54 so that the vane 42 is locked in place, thereby locking the trailer 12 in a selected position relative to the tractor 10. Normally the valve member 56 will be adjusted such that a controlled flow will be permitted through the orifice in the duct 54, the flow dictated by a time factor permitting the driver to respond to the turning or pivoting movement of the trailer relative to the tractor. A larger orifice opening permits a faster pivotal movement, a smaller opening, a slower pivotal movement.

FIG. 5 illustrates another preferred embodiment of the invention wherein valve 56 and the locking member 60 are replaced by a solenoid device 82 having a valve member 84 which selectively restricts the flow through the orifice in the duct 54 and is adapted to completely obstruct flow through the orifice in the duct 54 in response to an actuating force imposed on a handle 86 disposed preferably in the operator's compartment and which is connected to the solenoid 82. The arrangement illustrated in FIG. 5 permits the operator of the vehicle to quickly lock or release the tractor-trailer combination in a selected alignment in response to an emergency situation.

Although the control device 20 has been illustrated as working in combination with a coupling device 14 connecting two vehicle members together, it is obvious that on a small light weight combination such as a small house trailer and an automotive vehicle, that the control device itself can provide the coupling connection between the vehicles.

Having described my invention, I claim:

1. In an articulated vehicle having a tractor with a fifth wheel and a trailer with a king pin removably coupled to a V-shaped slot in said fifth wheel of said tractor, the combination with a vehicle control apparatus for controlling the relative pivotal movement between said tractor vehicle and said trailer vehicle, said control apparatus comprising:
  (a) a housing fixed to the forward end of said fifth wheel;
  (b) a fixed vane and a movable vane disposed in said housing, said movable vane rotatable about an axis parallel to the axis of said king pin, and said vanes in said housing being arranged to define a pair of cooperating, fluid tight chamber sections therein, each of said chamber sections having a variable volume dependent on the relative position of said movable vane in said chamber;
  (c) means providing a controlled fluid communication between said chambers,
  (d) means providing a connection between said movable vane and said trailer vehicle comprising: a lever member having a first lever section fixed to said movable vane and a second section attached to said trailer vehicle; and
  (e) means producing relative movement between said housing and said movable vane in response to a change of relative pivotal movement of said tractor vehicle and said trailer vehicle, said movement of said movable vane operative to produce a controlled rate of interchange of fluid in said chamber sections so that the relative movement of said trailer vehicle and said tractor vehicle corresponds to the controlled fluid interchange.

2. A combination as defined in claim 1 wherein said control apparatus includes means for blocking said fluid communication means so that relative movement between said tractor and said trailer is prevented.

3. A combination as defined in claim 1 wherein said housing of said vehicle control appartus defines a cylindrical chamber, said fixed vane has opposed faces defined by planes passing through the axis of said cylindrical chamber; said movable vane is supported for rotation about the axis of cylindrical chamber and has opposite pressure producing faces defined by a second pair of planes which intersect at the axis of said cylindrical chamber.

4. A combination as defined in claim 1 wherein said fluid communication means of said vehicle control apparatus comprises a conduit formed in said fixed vane and having its extreme ends registering with said first chamber section and said second chamber section, and including means providing a member selectively movable into said conduit to selectively restrict fluid flow between said first chamber section and said second chamber section.

5. A combination as defined in claim 4 wherein said restricted member of said vehicle control apparatus is solenoid actuated and includes means for remotely signalling said solenoid member.

6. In the combination of separable articulated vehicles having a connection between adjacent vehicles that allows said vehicles to pivot relative to each other about a vertical axis, a rotary hydraulic damping device for controlling the relative oscillations between said vehicles about said axis, said device comprising:
  (a) a cylindrical housing a fixed vane therein, said housing being fixedly attached to one of said vehicles,
  (b) a pivot journalled axially of said housing,
  (c) an oscillatable vane in said housing fixedly attached to said pivot, said vane dividing the interior of said housing with said fixed vane into two variable sector-shaped hydraulic chambers,
  (d) a lever means having two sections, one section fixedly attached to said pivot outside said housing, and the other section having means for releasably attaching said lever means to said other vehicle,
  (e) hydraulic duct means connecting said two hydraulic chambers, and
  (f) a pre-adjusted and set orifice means in said duct means for restricting the flow of liquid back and forth from one sector-shaped hydraulic chamber to the other to control said oscillations between said vehicles.

7. A combination as defined in claim 6 wherein said vehicles are a tractor and a trailer and said connection between them comprises a fifth wheel and a king pin.

8. A combination as defined in claim 6 wherein said hydraulic duct means is in said fixed vane.

9. A combination as defined in claim 6 wherein said pre-adjusted and set orifice means comprises a set screw and a locking screw therefor.

References Cited

UNITED STATES PATENTS

| | | | |
|---|---|---|---|
| 2,170,898 | 8/1939 | Humphrey | 280—432 |
| 1,652,254 | 12/1927 | Schlagenhauf. | |
| 2,379,170 | 6/1945 | McDaniel | 188—93 X |
| 2,709,088 | 5/1955 | Orbits | 280—432 |
| 3,036,845 | 5/1962 | Till | 280—432 |
| 3,136,566 | 6/1964 | Harding | 280—432 X |

FOREIGN PATENTS

| | | |
|---|---|---|
| 205,442 | 9/1956 | Australia. |
| 352,936 | 9/1937 | Italy. |

LEO FRIAGLIA, *Primary Examiner.*

U.S. Cl. X.R.

188—93; 280—446